United States Patent
Dexheimer et al.

(10) Patent No.: US 7,323,236 B2
(45) Date of Patent: Jan. 29, 2008

(54) WELT

(75) Inventors: Eduard Dexheimer, Velden (DE); Johann Gasslhuber, Buch am Erlbach (DE); Alois Müller, Ergoldsbach (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 191 days.

(21) Appl. No.: 10/673,573

(22) Filed: Sep. 30, 2003

(65) Prior Publication Data

US 2004/0115391 A1    Jun. 17, 2004

(30) Foreign Application Priority Data

Oct. 1, 2002    (DE) .............................. 102 45 816

(51) Int. Cl.
*B32B 3/06* (2006.01)
*B60R 13/06* (2006.01)
*B68G 7/10* (2006.01)

(52) U.S. Cl. ................. 428/99; 428/100; 428/123; 112/418; 49/500.1

(58) Field of Classification Search ............... 428/99, 428/100, 123, 31; 112/418; 280/153.5; 49/500.1; 277/652, 642
See application file for complete search history.

(56) References Cited

U.S. PATENT DOCUMENTS

| | | | | |
|---|---|---|---|---|
| 1,689,194 A | * | 10/1928 | Clark | 280/153.5 |
| 1,907,044 A | * | 5/1933 | Crowe | 280/153.5 |
| 2,347,158 A | * | 4/1944 | Spraragen | 49/479.1 |
| 2,566,282 A | * | 8/1951 | Bradley et al. | 280/153.5 |
| 2,616,723 A | * | 11/1952 | Lewis | 280/153.5 |
| 2,767,444 A | * | 10/1956 | Spraragen | 277/641 |
| 3,775,927 A | * | 12/1973 | Meyer | 52/718.06 |
| 4,789,201 A | * | 12/1988 | Selbert | 297/218.1 |
| 5,279,782 A | * | 1/1994 | Yamamoto et al. | 264/162 |
| 5,396,680 A | * | 3/1995 | Belanger | 15/230.16 |

FOREIGN PATENT DOCUMENTS

DE    39 27 385 A1    2/1991

* cited by examiner

*Primary Examiner*—Alexander S. Thomas
(74) *Attorney, Agent, or Firm*—Sughrue Mion, Pllc.

(57) ABSTRACT

The invention relates to a welt for positioning between adjoining components, in particular components used in the automobile industry. The welt according to the invention comprises a welt core and a laterally protruding welt flap. The welt is characterised in that the welt flap comprises at least one fastening element integrally formed therewith.

3 Claims, 3 Drawing Sheets

WELT

FIELD OF THE INVENTION

The invention relates to a welt (or bead) to be positioned between adjoining components, in particular for components in the automobile industry comprising a welt core and a welt flap protruding laterally therefrom.

PRIOR ART

Welts are originally known from the upholstery industry and are normally firmly bonded, welded or stitched to the covering material of the upholstery. Here, the welt runs along the edges of the upholstery and is used to fix the covering material precisely to the predetermined contour. Conventional welts frequently comprise a flexible welt core sheathed in a covering material and a laterally protruding welt flap. The sheathing comprises cut strips of covering material which are placed around the welt core and bonded or stitched at the ends. The welts produced in this way are then stitched onto the edges of the sown material.

DE 39 273 85 A1 discloses welt is for seams on upholstery material comprising a plastic core and a ribbon-shaped mesh fabric folded around the core connected on the internal side with an external decorative liner. The core comprises a weldable plastic. Protruding laterally from the core is a one-piece rod made of the same plastic that protrudes over the mesh fabric and hereby permits welding to the upholstery material.

In addition, welts have been used for a long time in the automobile industry. Here, they are positioned between adjoining body parts, for example the wing and the body frame. The welt used for this has holes in the welt flap area through which the bolts for fastening the wing to the body frame are inserted. The welt functions as a vibration-damping and possibly sealing component between the body parts surrounding the welt.

Welts are also used in automobile interiors, for example on the instrument panel or the door trims. These types of welts are mainly used for covering otherwise visible joints between a basic support and, for example, the arm rest in the door trim. Similarly, welts are used in the transitional area in the instrument panel between the centre panel and the covering, thus creating a smooth transition so that the occupants of the vehicle do not see the unattractive sight of the joints between these components. In this way, these welts embellish the aesthetic appearance of the automobile interior.

Exposure to strong sunlight and the associated intensive heat development can cause the components in the interior of the vehicle made of different materials to expand differently, thus resulting in tensions within these components and possibly noises during journey due to the relative movement of these components in relation to each other. Welts are used so-to-speak as buffers between these components. However, they may also compensate component tolerances in adjoining components.

DESCRIPTION OF THE INVENTION

It is therefore an object of the invention to provide a welt that may be used as a separate component without any additional fastening elements being required to fix it. This will enable the welt to be used over different component groups. At the same time, it must be compatible with industrial requirements for the automated covering of components. It should be suitable for permanent connection and dismountable and be able to accommodate the tolerances of the adjoining components in the visual range.

The invention is based on the concept of providing a welt that may be assembled and dismounted again quickly and simply and which accommodates the tolerances of the components adjoining the welt in the visual range. In addition, the welt has to take into account the requirements for mass production and automated covering of components.

In a preferred embodiment of the welt, one fastening element is provided between a welt-core end and a free end of the welt flap and a second fastening element is provided at the free end of the welt flap. A welt thus formed enables the welt to be used as an independent component and its fixing between two adjoining components is independent of the covering material used for the components since it is not necessary to weld the welt flap to the covering material. In addition, the welt may be fixed between adjoining components without additional fastening elements.

In another preferred embodiment, the two spaced-apart rod-shaped fastening elements extend in opposite directions relative to the welt flap. This is preferable because it makes the fixing or locking of the welt formed in this way between two adjoining components even simpler. Similarly, fastening elements of this type ensure the stable retention of the welt since the fastening element provided at the free end (lower fastening element) serves as a latching hook and the fastening element provided at the welt-core end of the welt flap (upper fastening element) serves as an abutment rib.

Preferred is a welt in which the angle between the welt flap and the lower and upper rod-shaped fastening element is the same. This achieves a uniform application of force on the components surrounding the welt, whereby the welt is held in a vertical orientation to the surfaces of the components surrounding it.

In another preferred embodiment, an anchor-shaped fastening element is provided at the lower free end of the welt flap. This enables the welt to be used in component recesses or component channels, such as the design may require on several points of a vehicle's instrument panel, and to be securely fixed therein. A fastening element formed in this way prevents the welt fixing from coming loose.

In another preferred embodiment, the lower fastening element has a Christmas-tree shaped profile. This further improves the fixing of the welt in a channel-shaped component recess, as described in the previous paragraph.

Also preferred is a welt which, in addition to the anchor-shaped or Christmas-tree shaped fastening element provided at the lower free end of the welt flap, has another fastening element arranged in the area of the welt-core end of the welt flap that is formed rod-shaped protruding substantially vertically to the longitudinal direction of the welt flap at opposing peripheral ends of the welt flap. A welt of this kind provides an aesthetically pleasing conclusion in a channel-shaped component recess, as described above. In addition, a welt of this kind prevents the accumulation of dirt in component recesses of this kind and can possibly also assume the function of a sealing element.

In another preferred embodiment, the upper and lower fastening elements are formed discontinuously with suitable recesses. This permits the insertion or the fixing of the welt in components with spaced-apart openings, for example rails provided with openings, in order to achieve a uniform and externally invisible fixing of the welt.

Also preferred is a welt having a cylindrical fastening element with a cylindrical recess around the welt flap. This enables the welt to be fixed in a round hole in a simple manner, whereby the top and bottom sides of the recess of the cylindrically formed fastening element lie on opposite sides of the round hole and the welt is unable to unintentionally work loose from the round hole.

Also preferred is a welt comprising a welt core with a circular cross section and a welt flap with a rod-shaped cross section.

In another preferred embodiment, the fastening element is a recess on the welt flap. The recess preferably passes through an angular range of 360° around the periphery of the welt flap. In this way, the welt may be simply and quickly introduced between the two fastening arms of a suitably designed metal clip and released from this later. The combination of a welt formed in this way with a metal clip is particularly advantageous for components with openings into which the metal clip is pressed or preassembled. This combination permits a more precise, better defined fixing of the welt on the adjoining component because the metal clip has lower wall thickness tolerances and greater strength.

Also preferred is a welt with a welt flap comprising an internal recess extending from the free end of the welt flap in the direction of the welt core end of the welt flap. Preferably, the recess provided in the interior of the welt flap corresponds to the shape of a "bottle head". A welt of this kind is advantageous for components that cannot be provided with openings or holes. Here, the welt is mounted on a lateral post in the metal clip whereby the metal clip itself is pushed laterally onto a component.

Preferably, the welt core is made of rubber and the welt flap of weldable polypropylene. For example, the welt may be produced with a suitable profile continuously in an extrusion process which improves the economic efficiency of the production.

In another preferred embodiment, the welt core has decorative material folded around the welt core connected on She internal side. Here, the decorative material may be mesh fabric, synthetic or genuine leather or any other textile. This permits the harmonisation of the appearance of adjoining components so that joints will not be immediately obvious to an observer at first glance. Here, preferably the welt flap extends beyond the decorative material. Preferably, the decorative material terminates flush with the upper fastening element.

In another preferred embodiment, the rigidity of the welt flap is greater than that of the welt core. This ensures that the welt core can accommodate component tolerances and nestle against the adjoining components. The welt core may, therefore, be designed with oversize dimensions. The greater rigidity of the welt flap increases the intrinsic rigidity of the whole welt resulting in better fixing of the welt.

Also preferred is a welt comprising a welt core in a multi-part design with at least one fastening element. Preferably, the welt flap has a first fastening element in an operative connection with a second fastening element that may be coupled to the welt flap. The second fastening element is preferably a metal clip. A welt of this type enables the welt to be preassembled on components and in gaps between adjoining components in a simple way. In addition, the metal clip ensures a more exact, better defined fixing of the welt on the component since the metal clip has lower wall thickness tolerances and greater strength.

BRIEF DESCRIPTION OF THE DRAWINGS

The invention will now be described purely as an example by means of the attached figures in which.

WAYS OF CARRYING OUT THE INVENTION

Figure 1:
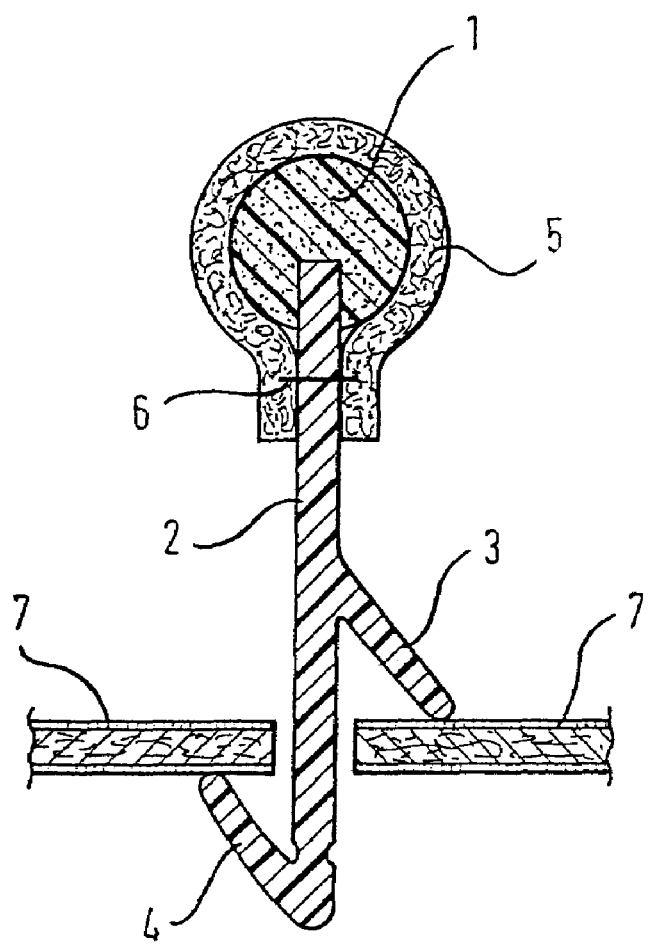
FIG. 1 is a cross-sectional view of a welt in accordance with a preferred embodiment of the invention.

FIG. 1 shows a cross-sectional view of a welt in accordance with a preferred embodiment of the invention.

The welt according to the invention comprises a core 1 and a welt flap 2 protruding laterally therefrom. In this embodiment, between the welt core end and the free end of the welt flap, there is a rod-shaped fastening element 3 extending in the direction of the free end of the welt flap. At the free end of the welt flap, there is another rod-shaped fastening element 4. The two rod-shaped fastening elements 3 and 4 extend in opposite directions to each other relative to the elongate welt flap in this embodiment. This arrangement and orientation of the fastening elements 3 and 4 enables the welt to be introduced and fixed between two adjoining components 7 in a simple way. In fixed condition, the fastening element 4 at the free end of the welt flap adjoins the lower surface of the component 7 in FIG. 1 and the upper fastening element 3 adjoins the upper surface of the component 7 shown in FIG. 1, thereby preventing the displacement of the welt in a direction vertical to the surfaces of the components 7.

The angle between the rod-shaped fastening elements and the welt flap is preferably 42°. The distance between the welt-flap ends of the two fastening elements along the welt flap is approximately equal to a third of the entire length of the welt flap. Preferably, the rod-shaped fastening elements are of equal length.

The welt core is preferably made of rubber while the welt flap is preferably produced from polypropylene. The rubber welt core is soft and smooth, thus enabling it to accommodate component tolerances. Due to the relatively high rigidity of polypropylene, the welt formed in this way will be endowed with high intrinsic rigidity which in turn minimises the probability of the welt working loose and its displacement from the gap between the components 7. It is also feasible to produce the welt flap and the fastening elements from different polymer materials, for example, the plastic used for the fastening elements may be more rigid than the polymer materials used for the welt flap.

The welt shown in FIG. 1 has decorative material 5 folded around the welt core and connected to the welt flap on the internal side. The internal connection 6 of the decorative material with the welt flap may be achieved by bonding, welding, sewing or other methods known to a person skilled in the art. The decorative material may be mesh fabric, synthetic or genuine leather or any other textile. In the fixed condition of the welt, the provision of the decorative material around the welt core provides an aesthetically pleasing appearance in that the joints between the adjoining components 10 are no longer visible in an observer's field of view. The decoratively smooth transition between the components is also further improved by the appearance of the decorative material.

A welt of this kind produced from rubber and polypropylene may be produced continuously in an extrusion process. The covering of the welt core by the decorative material may also be performed automatically. Due to these advantages, the welt according to the invention meets all the requirements for industrial production.

Figure 2:
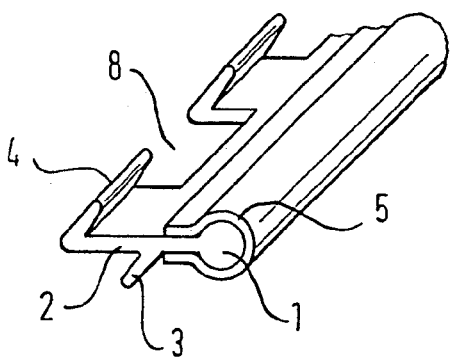
FIG. 2 is a perspective view of the welt shown in FIG. 1.

FIG. 2 shows a perspective view of the welt according to the invention shown in FIG. 1. As may be seen in FIG. 2, the lower and upper fastening elements have recesses 8. Thus, the lower and upper fastening elements do not extend continuously in the longitudinal direction of the welt. The depth of the recess enables the rigidity of the profiled welt flap to be varied extremely widely depending on its application.

Figure 3:
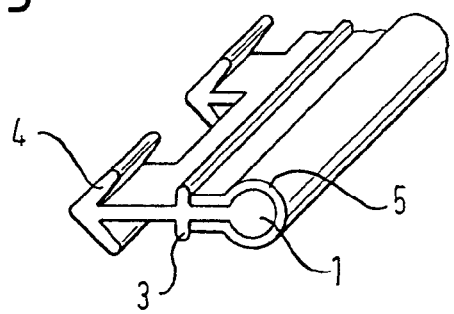
FIG. 3 is a perspective view of a welt in accordance with another preferred embodiment of the invention.

FIG. 3 is a perspective view of a welt in accordance with another embodiment of the invention. The lower fastening element of the welt shown in FIG. 3 has an anchor shape, while the upper fastening element protrudes substantially vertically to the welt flap at the opposing peripheral end of the welt flap.

In this embodiment, the anchor tips lie in a plane perpendicular to the longitudinal direction of the welt. The distance between the anchor tips and the welt flap substantially corresponds to the transverse extension of the upper fastening element. In this embodiment, the decorative material surrounding the welt core terminates flush with the upper fastening element. A welt of this kind can both bridge and seal gaps between adjoining components due to the design of the upper fastening element shown here.

Figure 4:
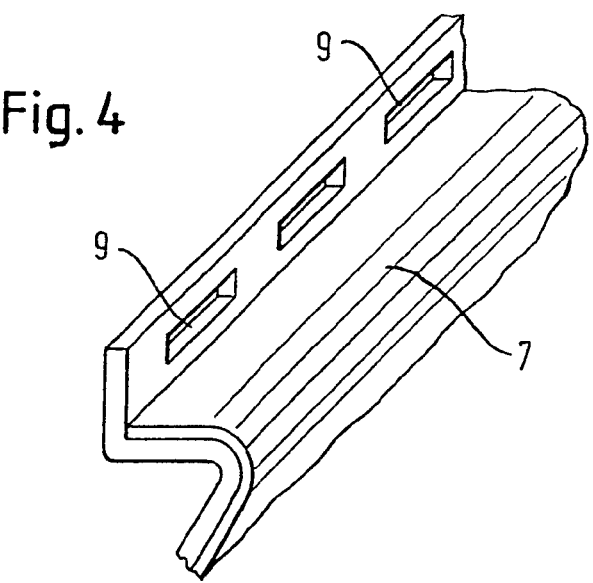
FIG. 4 is a perspective view of a component to which the welt according to the invention may be attached.

FIG. 4 shows a perspective view of a component to which the welt shown in FIGS. 1 and 2 or FIG. 3 may be attached. The welt is attached to the component by simply pressing it into the openings 9 provided in the component 7. If required, the welt may be simply removed from the component again without the welt being damaged which otherwise would exclude the possibility of re-using the same welt. This is of great importance in particular for repair work in the field of automobile interiors during which, for example, the door trims, the instrument panel, etc. have to be removed and re-fitted to obtain access to automobile components located beneath them.

Figure 5:
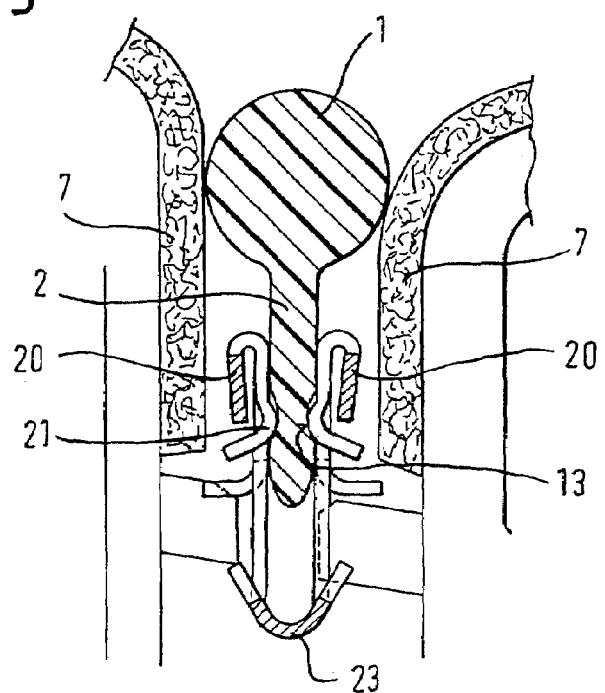
FIG. 5 is a perspective view of a welt in accordance with another preferred embodiment of the invention.

FIG. 5 shows a cross-sectional view of a welt in accordance with another preferred embodiment of the invention. The welt in FIG. 5 has a recess or notch 13 on the welt flap between its free end and its welt-core end. The diameter of the welt flag at its free end is less than the diameter at the welt-core end. A welt formed in this way is introduced between two fastening arms 20 of a correspondingly designed metal clip 23 and in this way serves as a bridge between two adjoining components 7. The welt is held in the metal clip by elastic projections 21 that engage in the welt's recess 13. The welt may be pulled out of the metal clip by moving the arms 20 or the metal clip in a direction away from the welt flap.

Figure 6:
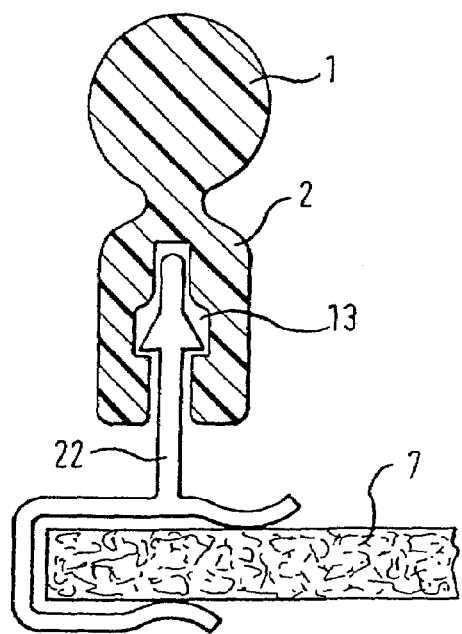
FIG. 6 is a cross-sectional view of a welt in accordance with another preferred embodiment of the invention.

FIG. 6 is a cross-sectional view of a welt in accordance with another preferred embodiment of the invention. The welt in FIG. 6 has an elongated recess within the welt flap The recess is provided with an enlarged central portion. Here, the recess extends from the free end of the welt flap in the direction of the welt core end of the welt flap. Introduced into the elongated recess is a post 22 which protrudes laterally from a metal clip. The post 22 is provided with an enlarged central portion which engages in the enlarged central portion of the recess. The metal clip is pushed laterally onto a component 7 and the welt is then mounted on the post. The elasticity of the material used for the welt flap enables the welt to be removed from the post and reused without any problem. The welts shown in FIG. 5 and FIG. 6 are also suitable for preassembly on suitable components.

The inventive concept of the invention is to provide a welt that may be produced inexpensively by automatic production processes. In addition, the invention is based on the concept of providing a welt which may be assembled without any additional fastening elements, and hence may be installed as a independent component and extend over several components. In addition, the welt according to the invention may be assembled and removed again several times whereby it has advantages over conventional welts, particularly for the automobile industry. Particularly for repair work, it is very important that the welts may be replaced subsequently. In addition, by means of a suitable choice of the materials used for the welt, the welt may have high rigidity, particularly in the area of the welt flap and the fastening elements protruding laterally therefrom. A suitably chosen soft material for the welt core enables the welt formed in this way to accommodate component tolerances, whereby it ideally nestles against adjoining components and may be designed with oversize dimensions.

What is claimed is:

1. A welt for positioning between adjoining components, the welt comprising;
    a welt core,
    a decorative material substantially covering said welt core;
    a welt flap protruding from within said welt core and having opposing ends; and
    a first fastening element integrally formed with the welt flap at a free end of the welt flap and having an anchor-shape; and
    a rod-shaped second fastening element, integrally formed with the welt flap in the area of the welt core end of the welt flap, protruding substantially perpendicular to the longitudinal direction of the welt flap at opposing peripheral ends of the welt flap;
    wherein the decorative material is one of mesh fabric, synthetic or genuine leather, and a textile fabric; and
    wherein the welt flap and the first and second fastening elements are made of a more rigid material than the welt core.

2. A welt comprising:
    a welt core;
    a decorative material substantially covering said welt core;
    a welt flap laterally protruding from within said welt core and having a first end within said welt core and a second end away from said welt core;
    wherein the welt flap is made of a more rigid material than the welt core; and
    wherein a recess is formed in the second end of the welt flap.

3. Welt according to claim 2, wherein the recess has an enlarged central portion.

* * * * *